United States Patent
Parga-Cacheiro

(10) Patent No.: US 9,931,940 B2
(45) Date of Patent: Apr. 3, 2018

(54) SAFETY APPARATUS FOR MONITORING CHARGING OF AN ELECTRICAL ENERGY STORE IN A MOTOR VEHICLE, AND METHOD FOR OPERATING A SAFETY APPARATUS FOR MONITORING CHARGING OF AN ELECTRICAL ENERGY STORE IN A MOTOR VEHICLE

(71) Applicant: Robert Bosch GmbH, Stuttgart (DE)

(72) Inventor: Jose-Luis Parga-Cacheiro, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 91 days.

(21) Appl. No.: 14/442,270

(22) PCT Filed: Oct. 17, 2013

(86) PCT No.: PCT/EP2013/071717
§ 371 (c)(1),
(2) Date: May 12, 2015

(87) PCT Pub. No.: WO2014/079630
PCT Pub. Date: May 30, 2014

(65) Prior Publication Data
US 2016/0263999 A1    Sep. 15, 2016

(30) Foreign Application Priority Data
Nov. 20, 2012    (DE) .................. 10 2012 221 123

(51) Int. Cl.
*B60L 3/04* (2006.01)
*B60L 3/00* (2006.01)
(Continued)

(52) U.S. Cl.
CPC ............ *B60L 3/04* (2013.01); *B60L 3/0046* (2013.01); *B60L 11/1816* (2013.01);
(Continued)

(58) Field of Classification Search
CPC ... B60L 11/1838; Y02T 10/7088; Y02T 90/14
See application file for complete search history.

(56) References Cited

U.S. PATENT DOCUMENTS 4,893,691 A * 1/1990 Park ........................ B60T 13/72
                                                                180/169
6,450,587 B1 * 9/2002 MacGregor ............... B60T 7/10
                                                                303/89
(Continued)

FOREIGN PATENT DOCUMENTS

DE    102008039955    3/2010
DE    102009001962    10/2010
(Continued)

OTHER PUBLICATIONS

International Search Report for Application No. PCT/EP2013/071717 dated Aug. 6, 2013 (English Translation, 3 pages).

*Primary Examiner* — Kimberly S Berona
*Assistant Examiner* — Jordan S Fei
(74) *Attorney, Agent, or Firm* — Michael Best & Friedrich LLP

(57) ABSTRACT

The present invention relates to a safety apparatus (20) for monitoring charging of an electrical energy store in a motor vehicle (100), having at least one first sensor device (21*a*) and at least one second sensor device (21*b*), the two of which are each designed to capture motion data for the motor vehicle (100) and to provide said motion data as a sensor signal; and a control device (25) that is coupled to the at least one first sensor device (21*a*) and to the at least one second sensor device (21*b*) and that is designed to deactivate the at least one second sensor device (21*b*) while the electrical energy store is being charged and, if the control device (25) detects motion of the motor vehicle (100) on the basis of one of the provided sensor signals, to actuate at least one (Continued)

actuator device (30) of the motor vehicle (100) in order to brake the motor vehicle (100).

18 Claims, 1 Drawing Sheet

(51) Int. Cl.
  *B60L 11/18* (2006.01)
  *B60L 15/20* (2006.01)
  *B60T 7/12* (2006.01)
  *H02J 7/00* (2006.01)

(52) U.S. Cl.
  CPC ....... *B60L 11/1838* (2013.01); *B60L 15/2054* (2013.01); *B60T 7/12* (2013.01); *H02J 7/0026* (2013.01); *B60L 2230/12* (2013.01); *B60L 2240/12* (2013.01); *B60L 2240/461* (2013.01); *B60L 2240/486* (2013.01); *B60L 2240/507* (2013.01); *B60L 2240/80* (2013.01); *B60T 2230/00* (2013.01); *H02J 7/0029* (2013.01); *Y02T 10/645* (2013.01); *Y02T 10/7005* (2013.01); *Y02T 10/7088* (2013.01); *Y02T 10/72* (2013.01); *Y02T 10/7275* (2013.01); *Y02T 90/121* (2013.01); *Y02T 90/14* (2013.01)

(56) References Cited

U.S. PATENT DOCUMENTS

| | | | |
|---|---|---|---|
| 2003/0154776 A1* | 8/2003 | Naik | G01D 3/10 73/114.73 |
| 2004/0178028 A1* | 9/2004 | Farmer | B60T 13/741 188/162 |
| 2010/0072946 A1* | 3/2010 | Sugano | B60L 3/0046 320/108 |
| 2011/0227714 A1 | 9/2011 | Kamaga | |

FOREIGN PATENT DOCUMENTS

| | | |
|---|---|---|
| DE | 102010054927 | 6/2012 |
| DE | 102010062369 | 6/2012 |
| DE | 102011078869 | 1/2013 |
| JP | 0218141 | 1/1990 |
| JP | 2007189769 | 7/2007 |
| JP | 2009118658 | 5/2009 |
| KR | 20120031610 | 4/2012 |
| WO | 2013129218 | 9/2013 |

\* cited by examiner

SAFETY APPARATUS FOR MONITORING CHARGING OF AN ELECTRICAL ENERGY STORE IN A MOTOR VEHICLE, AND METHOD FOR OPERATING A SAFETY APPARATUS FOR MONITORING CHARGING OF AN ELECTRICAL ENERGY STORE IN A MOTOR VEHICLE

BACKGROUND OF THE INVENTION

The present invention relates to a safety device for monitoring charging of an electrical energy store of a motor vehicle and a method for operating a safety apparatus for monitoring charging of an electrical energy store in a motor vehicle.

In motor vehicles with internal combustion engines, most control devices can be switched off after as short a run-down time as possible when the vehicle is parked. In contrast, in the case of electric vehicles, a new operating state, in comparison with vehicles with internal combustion engines, supervenes the charging of the batteries.

In particular, electric vehicles or hybrid vehicles, so-called plug-in hybrids, have an energy store which can be recharged from the electrical grid. Vehicles such as this have a grid connection for recharging the electrical energy store, often in the form of a plug-in connection. During the charging process, the motor vehicle is connected to a voltage supply via a charging cable.

DE 10 2010 062 369 A1 describes a charging device without potential isolation for motor vehicles: having a first switchable isolating device which is designed to open and/or to close at least the conductor through which current flows of a charging cable that couples the charging device to a supply grid, in order to produce or break potential isolation between vehicle ground and neutral conductor of the charging cable.

Furthermore, the charging device described in that document has a second switchable isolating device which is designed to open and/or to close at least one line which connects the vehicle high-voltage battery to the charging device and/or to a vehicle onboard grid; and a monitoring device which is designed to monitor a fault state of the charging device or of the motor vehicle and to transmit a corrective signal to the first and/or second isolating device on the basis of the fault state.

DE 10 2009 001 962 A1 describes a charging system for use in a vehicle with vehicle ground at earth potential, comprising a vehicle high-voltage grid containing a high-voltage battery with battery isolation device and optionally one or more consumers; a charging device which is conductively connected to the high-voltage battery and can be integrated in the vehicle and has a grid isolating device which is connectable to a charging grid via a grid plug.

The charging system described in that document also comprises one or more residual current circuit breakers for monitoring residual current during a charging process, wherein the residual current circuit breakers are arranged such that the charging system is isolatable from a connected charging grid via the residual current circuit breakers, a protective conductor which is connectable to the vehicle ground, and means for permanently monitoring the protective conductor function during a charging process, wherein the means are configured such that, if the protective conductor function is impaired, the battery isolating device of the high-voltage battery and the grid isolating device of the charging device are triggerable.

Moreover, in the charging system described in that document, means are provided for isolation monitoring of the vehicle high-voltage network and of the charging device before the start of a charging process, wherein the means are configured such that, if an isolation fault is detected, the battery isolating device of the high-voltage battery and the grid isolating device of the charging device are triggerable.

SUMMARY OF THE INVENTION

The present invention relates to a safety device for monitoring charging of an electrical energy store of a motor vehicle and to a method for operating a safety device for monitoring charging of an electrical energy store of a motor vehicle.

Accordingly, a safety device for monitoring charging of an electrical energy store in a motor vehicle is provided having at least one first sensor device and at least one second sensor device which are both each designed to detect movement data of the motor vehicle and to provide it as a sensor signal; and a control device which is coupled to the at least one first sensor device and to the at least one second sensor device and which is designed to deactivate the at least one second sensor device during charging of the electrical energy store and, if a movement of the motor vehicle is detected by the control device on the basis of one of the sensor signals provided, to actuate at least one actuator device of the motor vehicle in order to brake the motor vehicle.

According to another aspect of the present invention, a method is provided for operating a safety device for monitoring charging of an electrical energy store of a motor vehicle, having the following method steps: detecting movement data of the motor vehicle and providing a sensor signal using at least one first sensor device and at least one second sensor device; deactivating the at least one second sensor device during charging of the electrical energy store; and actuating at least one actuator device of the motor vehicle if a movement of the motor vehicle is detected by the control device on the basis of one of the sensor signals provided.

The core of the invention consists in monitoring vehicle movements during charging of the electrical energy store of the motor vehicle not with all sensor devices of the motor vehicle at the same time, but rather activating only one sensor device or at least only a subset of the sensor devices of the motor vehicle and using said sensor device(s) to monitor vehicle movements during charging of the electrical energy store of the motor vehicle.

The sensor devices which are not used are disconnected for a particular time period, that is to say monitoring is performed only using the subset of sensor devices which are switched on.

If a movement of the motor vehicle is established in this connection, the safety device can either introduce directly corresponding measures, that is to say actuate an actuator device of the motor vehicle, or activate the supply to the remaining switched-off sensor devices in order to verify the movement of the motor vehicle. As a result, a malfunction of the charging cable owing to an unplugging of the motor vehicle from the stationary charging station during charging of the electrical energy store of the motor vehicle can advantageously be avoided.

The sensor devices of the motor vehicle may, from time to time, be alternately activated and deactivated in a rotation method, with the result that there are always various sensor devices activated in alternating sequence during charging of the motor vehicle.

Since not all of the sensor devices of the motor vehicle are therefore active and/or in operation during the entire charging of the electrical energy store of the motor vehicle, the respective operating times of the individual sensor devices of the motor vehicle are advantageously reduced.

Since charging of the electrical energy store of the motor vehicle takes longer than a driving cycle, the requirements on the service life of the sensor devices and the control devices increases significantly as a result. The use of the safety device with the rotation method advantageously reduces the respectively required period of application or switch-on time of the individual sensor devices of the motor vehicle.

According to an embodiment of the invention, provision is made for the control device also to be designed to activate the at least one second deactivated sensor device, and hence to verify the detected movement of the motor vehicle, if a movement of the motor vehicle is detected by the control device on the basis of one of the sensor signals provided. This advantageously permits a movement of the motor vehicle to be established with increased certainty and reliability.

According to an embodiment of the invention, provision is made for the control device to also be designed to alternately activate or to deactivate the at least one first sensor device and the at least one second sensor device in order to minimize an operating period of the at least one first sensor device and the at least one second sensor device. As a result, the service life of the at least two sensor devices of the safety device can advantageously be increased.

According to an embodiment of the invention, provision is made for the control device to also be designed to perform the alternating activation and deactivation of the at least one first sensor device and the at least one second sensor device after a predetermined time period. This enables simple and safe control of the at least two sensor devices of the safety device.

According to an embodiment of the invention, provision is made for the control device to also be designed to perform the alternating activation and deactivation of the at least one first sensor device and the at least one second sensor device on the basis of a predetermined rotation method. As a result, the loading and the demands on the at least two sensor devices of the safety device can advantageously be evenly distributed in a balanced manner between the at least two sensor devices.

According to an embodiment of the invention, provision is made for at least one of the at least one first sensor device and the at least one second sensor device to have a sensor unit and a signal converter unit. As a result, various sensor units of the at least two sensor devices can advantageously be actuated by signal converter units which are appropriately adapted to the respective sensor unit.

According to an embodiment of the invention, provision is made for the safety device to also have a memory device which is designed to store in each case a switch-on time which has already been achieved up to now of a sensor device of the at least one first sensor device and the at least one second sensor device. As a result, an achieved switch-on time of the sensor device can advantageously be detected in each case individually for each of the at least two sensor devices and stored in the memory device of the safety device.

According to an embodiment of the invention, provision is made for the sensor unit to be designed as a rotational-speed sensor. As a result, it is possible to simply and safely detect a movement of the motor vehicle on the basis of a movement of a vehicle axle.

According to an embodiment of the invention, provision is made for the at least one actuator device to be designed as an electronic braking system of the motor vehicle. As a result, a movement of the motor vehicle during charging of the electrical energy store of the motor vehicle can advantageously be stopped in a reliable manner.

The described configurations and developments can be combined with one another as desired.

Further possible configurations, developments and implementations of the invention comprise combinations—including those not explicitly mentioned—of features of the invention described above or in the following text with reference to the exemplary embodiments.

BRIEF DESCRIPTION OF THE DRAWINGS

The appended drawings are intended to provide improved understanding of the embodiments of the invention. They illustrate embodiments and, in conjunction with the description serve to explain principles and concepts of the invention.

Other embodiments and many of the mentioned advantages can be gleaned from the drawings. The elements in the drawings are not necessarily shown true to scale with respect to one another.

In the figures:

FIG. 1 shows a schematic illustration of a safety device for monitoring charging of an electrical energy store of a motor vehicle according to an embodiment of the invention; and FIG. 2 shows a schematic illustration of a flow chart of a method for operating a safety device for monitoring charging of an electrical energy store of a motor vehicle according to another embodiment of the invention.

DETAILED DESCRIPTION

Figure 1:
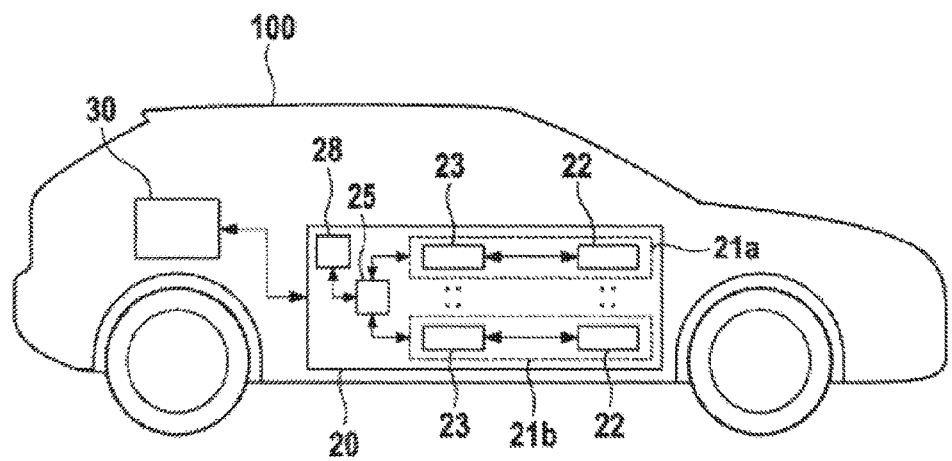

In the figures of the drawing, identical reference signs refer to identical or functionally identical elements, parts, components or method steps, unless stated otherwise.

FIG. 1 shows a schematic illustration of a safety device for monitoring charging of an electrical energy store of a motor vehicle according to an embodiment of the invention.

An electric vehicle or a hybrid motor vehicle or another motor vehicle can be designed as the motor vehicle 100 to be charged which has an electrical energy store that can be charged during a charging process of the motor vehicle 100 from a stationary charging station or from a charging column.

The electrical energy store of the motor vehicle 100 is designed, for example, as a lithium-ion rechargeable battery or as a lithium-polymer rechargeable battery or as a nickel-cadmium rechargeable battery or as a nickel-metal hydride rechargeable battery or as another rechargeable battery.

A safety device 20 for monitoring charging of an electrical energy store of a motor vehicle 100 comprises, by way of example, at least two sensor devices, that is to say at least one first sensor device 21a and at least one second sensor device 21b, and a control device 25.

The at least two sensor devices 21a, 21b can each be designed to detect movement data of the motor vehicle 100 and to provide it as a sensor signal.

Data relating to a position of the motor vehicle 100, data relating to a speed of the motor vehicle 100 or data relating to a presently prevailing rotational speed of an axle of the motor vehicle 100 can be detected as movement data of the motor vehicle 100 by the control device 25.

The control device 25 of the safety device 20 can be coupled to the at least two sensor devices 21a, 21b and be designed to activate or deactivate at least one sensor device 21a, 21b or a subset of the at least two sensor devices 21a, 21b.

Furthermore, the control device 25 of the safety device 20 can be designed to actuate at least one actuator device 30 of the motor vehicle 100 in order to brake the motor vehicle 100, and hence to monitor charging of the electrical energy store of the motor vehicle 100, if a movement of the motor vehicle 100 is detected by the control device 25 on the basis of one of the sensor signals provided.

Moreover, the control device 25 can be designed to activate at least one deactivated sensor device 21a, 21b of the at least two sensor devices 21a, 21b, and hence to verify the detected movement of the motor vehicle 100, if a movement of the motor vehicle 100 is detected by the control device 25 on the basis of the sensor signal provided.

The at least two sensor devices 21a, 21b of the safety device 20 can each have, for example, a sensor unit 22 and/or a signal converter unit 23.

Furthermore, the safety device 20 can have a memory device 28 which is designed to store in each case an operating time which has already been achieved up to now or a switch-on time which has already been achieved up to now of a sensor device 21a, 21b of the at least two sensor devices 21a, 21b.

The control device 25 of the safety device 20 can also be designed to calculate an operating strategy for the further use of the at least two sensor devices 21a, 21b and/or an operating strategy for a rotation method for alternate use of the at least two sensor devices 21a, 21b of the safety device 20 on the basis of the operating times of the sensor devices 21a, 21b stored in the memory device 28.

The at least two sensor devices 21a, 21b of the motor vehicle 100 can also have a rotational-speed sensor or another movement sensor as the sensor unit 22. By way of example, a rotational-speed sensor is formed on a single wheel of the motor vehicle 100, which rotational-speed sensor can detect a rotation of the respective wheel by a predetermined angular range or a rotational speed of the respective wheel of the motor vehicle 100.

The respective signal converter units 23 of the at least two sensor devices 21a, 21b of the safety device 20 are designed, for example, as integrated evaluation devices for evaluating sensor signals of the sensor units 22 of the safety device 20, which evaluation devices are present in a driving dynamics control system which is present in the motor vehicle 100.

The signal converter units 23 of the at least two sensor devices 21a, 21b can be designed, for example, as an electrical amplifier circuit for the sensor units 22 for signal processing and/or signal standardization of the voltage signals generated by the sensor unit 22.

By way of example, the at least one actuator device 30 is designed as an electronic braking system of the motor vehicle 100 or as another system for braking or stopping the motor vehicle 100. Furthermore, the actuator device 30 can be designed as a coupling device of the motor vehicle 100 or as an automatic transmission of the motor vehicle 100.

The actuator device 30 can be actuated by the safety device 20 via a vehicle-internal bus system of the motor vehicle 100, for example a CAN bus system. Likewise, the at least two sensor devices 21a, 21b of the safety device 20 can be coupled to the control device 25 of the safety device 20 via such a vehicle-internal bus system of the motor vehicle 100.

The control device 25 of the safety device 20 can be designed as a program-controlled device or as a microcontroller or as a configurable logic component or as an integrated circuit or as an application-specific integrated circuit or as a computer or as an embedded system.

The memory device 28 of the safety device 20 can be designed as a data memory or as a semiconductor memory, wherein microelectronic memory structures are formed in and on a semiconductor substrate and the data to be stored in the memory device 28 are stored in the form of binary electronic switching states in the integrated circuits designed in such a way.

The control device 25 of the safety device 20 and/or the at least two sensor devices 21a, 21b and/or the memory device 28 of the safety device 20 are designed, for example, as technical components which are connected as a network.

Figure 2:
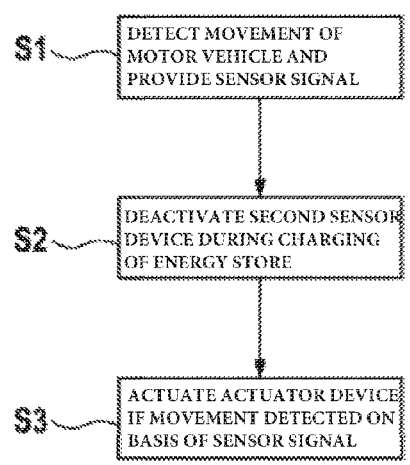

FIG. 2 shows a schematic illustration of a flow chart of a method for operating a safety device 20 for monitoring charging of an electrical energy store of a motor vehicle 100 according to another embodiment of the invention.

As a first method step of the method for operating a safety device 20, movement data of the motor vehicle 100 is detected S1 and a sensor signal is provided using at least one first sensor device 21a and at least one second sensor device 21b.

As a second method step of the method for operating a safety device 20, the at least one second sensor device 21b is deactivated 52 during charging of the electrical energy store.

If a movement of the motor vehicle 100 is detected by the control device 25 on the basis of one of the provided sensor signals, at least one actuator device 30 of the motor vehicle 100 is actuated 53 as a third method step of the method for operating a safety device in order to brake the motor vehicle 100 in order to monitor the charging of the electrical energy store of the motor vehicle 100 as a result.

In this case, the method steps may be repeated in any desired sequence, iteratively or recursively. The method for monitoring charging of an electrical energy store of a motor vehicle 100 can be performed, for example, by the safety device 20 of the motor vehicle 100.

Although the present invention has been described above on the basis of preferred exemplary embodiments, it is not restricted to these but modifiable in many ways. In particular, the invention may be changed or modified in various ways without deviating from the core of the invention.

The invention claimed is:
1. A system comprising:
   at least one first sensor device configured to:
   detect a movement of a motor vehicle, and
   generate a first sensor signal in response to detecting the movement of the motor vehicle;
   at least one second sensor device configured to:
   detect the movement of the motor vehicle, and
   generate a second sensor signal in response to detecting the movement of the motor vehicle; and
   a safety control device coupled to the at least one first sensor device and to the at least one second sensor device, the safety control device configured to:
   monitor charging of an electrical energy store of the motor vehicle,
   receive the first sensor signal,
   receive the second sensor signal, and control at least one actuator device configured to brake the motor vehicle in response to monitoring the charging of the electrical energy store and in response to receiving at least one of the first sensor signal or the second sensor signal.

2. The system of claim 1, wherein the safety control device is further configured to alternately activate or to deactivate the at least one first sensor device and the at least one second sensor device to minimize an operating period of the at least one first sensor device and the at least one second sensor device.

3. The system of claim 2, wherein the safety control device is further configured to perform an alternating activation and deactivation of the at least one first sensor device and the at least one second sensor device after a predetermined time period.

4. The system of claim 2, wherein the safety control device is further configured to perform an alternating activation and deactivation of the at least one first sensor device and the at least one second sensor device on a basis of a predetermined rotation method.

5. The system of claim 1, wherein at least one of the at least one first sensor device and the at least one second sensor device has a sensor unit and a signal converter unit.

6. The system of claim 5, wherein the sensor unit is configured as a rotational-speed sensor.

7. The system of claim 1, further comprising a memory device which is configured to store in each case a switch-on time which has already been achieved up to now of a sensor unit of the at least one first sensor device or the at least one second sensor device.

8. The system of claim 1, wherein the at least one actuator device is an electronic braking system of the motor vehicle.

9. A method for operating a system, the method comprising:
    detecting, with at least one first sensor device, a movement of a motor vehicle;
    generating, with the at least one first sensor device, a first sensor signal in response to detecting the movement of the motor vehicle;
    detecting, with at least one second sensor device, the movement of the motor vehicle;
    generating, with the at least one second sensor device, a second sensor signal in response to detecting the movement of the motor vehicle;
    monitoring, with a safety control device, charging of an electrical energy store of the motor vehicle;
    receiving, with the safety control device, the first sensor signal and the second sensor signal; and
    controlling, with the safety control device, at least one actuator device configured to brake the motor vehicle in response to monitoring the charging of the electrical energy store of the motor vehicle and in response to receiving the first sensor signal and the second sensor signal.

10. A system comprising:
    at least one first sensor device configured to:
        detect a movement of a motor vehicle, and
        generate a first sensor signal in response to the movement of the motor vehicle;
    at least one second sensor device configured to:
        detect the movement of the motor vehicle, and
        generate a second sensor signal in response to the movement of the motor vehicle; and
    a safety control device coupled to the at least one first sensor device and to the at least one second sensor device, the safety control device configured to:
        monitor charging of an electrical energy store of the motor vehicle,
        receive the first sensor signal,
        receive the second sensor signal,
        deactivate the at least one second sensor device in response to monitoring charging of the electrical energy store of the motor vehicle, and
        control at least one actuator device configured to brake the motor vehicle in response to monitoring the charging of the electrical energy store and in response to receiving at least the first sensor signal.

11. The system of claim 10, wherein the safety control device is further configured to activate the at least one second sensor device in response to receiving the first sensor signal to verify the movement of the motor vehicle using the second sensor signal.

12. The system of claim 10, wherein the safety control device is further configured to alternately activate or to deactivate the at least one first sensor device and the at least one second sensor device to minimize an operating period of the at least one first sensor device and the at least one second sensor device.

13. The system of claim 12, wherein the safety control device is further configured to perform an alternating activation and deactivation of the at least one first sensor device and the at least one second sensor device after a predetermined time period.

14. The system of claim 12, wherein the safety control device is further configured to perform an alternating activation and deactivation of the at least one first sensor device and the at least one second sensor device on a basis of a predetermined rotation method.

15. The system of claim 10, wherein at least one of the at least one first sensor device and the at least one second sensor device has a sensor unit and a signal converter unit.

16. The system of claim 15, wherein the sensor unit is configured as a rotational-speed sensor.

17. The system of claim 10, further comprising a memory device which is configured to store in each case a switch-on time which has already been achieved up to now of a sensor unit of the at least one first sensor device or the at least one second sensor device.

18. The system of claim 10, wherein the at least one actuator device is an electronic braking system of the motor vehicle.

* * * * *